(12) United States Patent
Cone

(10) Patent No.: US 7,387,497 B2
(45) Date of Patent: Jun. 17, 2008

(54) ADAPTER

(76) Inventor: Matthew D. Cone, 1329 Nickerson Rd., Nickerson, NE (US) 68044

( * ) Notice: Subject to any disclaimer, the term of this patent is extended or adjusted under 35 U.S.C. 154(b) by 463 days.

(21) Appl. No.: 11/103,879

(22) Filed: Apr. 12, 2005

(65) Prior Publication Data

US 2006/0228218 A1     Oct. 12, 2006

(51) Int. Cl.
*F03D 11/04* (2006.01)
(52) U.S. Cl. .................. 416/244 R; 248/674; 248/415; 248/186.1; 248/187.1; 248/219.2
(58) Field of Classification Search ............ 416/244 R; 248/415, 186.1, 187.1, 219.2, 674; 52/40
See application file for complete search history.

(56) References Cited

U.S. PATENT DOCUMENTS

| 1,755,422 | A | * | 4/1930 | Bucklen ....................... 416/13 |
| 4,248,025 | A | * | 2/1981 | Kleine et al. .............. 52/732.3 |
| 4,469,956 | A | * | 9/1984 | D'Amato ..................... 290/55 |
| 6,408,575 | B1 | * | 6/2002 | Yoshida et al. ................ 52/40 |

* cited by examiner

*Primary Examiner*—Ninh H Nguyen
(74) *Attorney, Agent, or Firm*—Thomte Patent Law Office; Dennis L. Thomte

(57) ABSTRACT

An adapter is provided for mounting a wind turbine on the upper end of a wind turbine tower even though the yaw plate of the wind turbine is not complementary in shape to the upper end of the wind turbine tower.

5 Claims, 7 Drawing Sheets

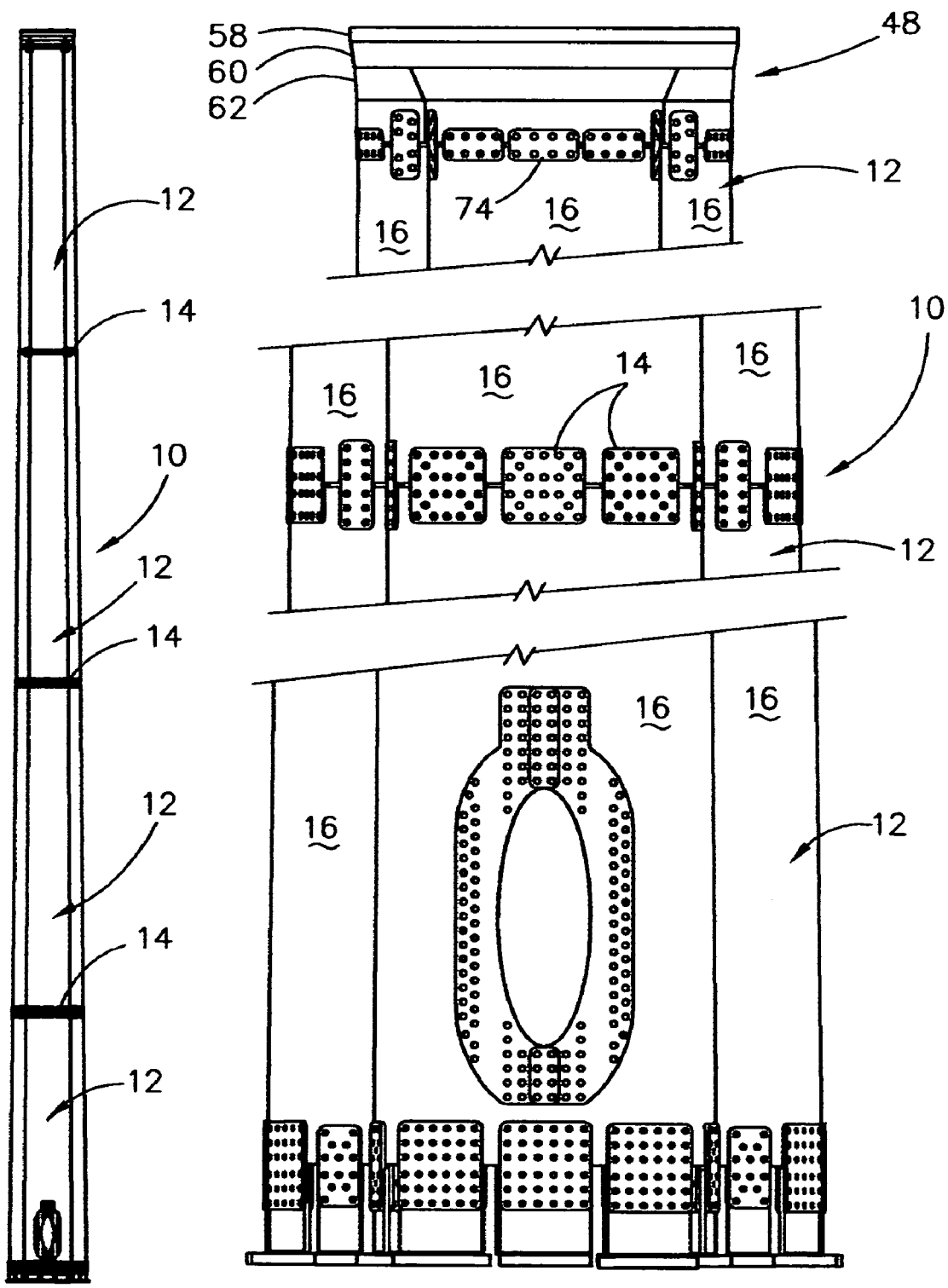

ADAPTER

BACKGROUND OF THE INVENTION

1. Field of the Invention

This invention relates to an adapter and more particularly to an adapter to enable a wind turbine to be secured to the upper end of a wind turbine tower.

2. Description of the Related Art

A wind turbine normally comprises a rotor-driven generator mounted atop a tower which may reach heights of 70 meters or more. Upwind turbines face into the wind with those turbines utilizing a yaw drive to cause the turbine to face into the wind as the wind direction changes. Yaw drives normally include a flat, circular yaw plate or ring which is secured to the upper end of the tower with the wind turbine being rotatably mounted thereon. Prior to assignee's invention disclosed in the patent application entitled "HOLLOW STRUCTURAL MEMBER", Ser. No. 10/797,778 filed Mar. 10, 2004, the wind turbine towers were generally tubular or cylindrical in cross section. In assignee's co-pending application, the wind turbine tower is comprised of a plurality of elongated hollow pole sections secured together in an end-to-end relationship. Each of the hollow pole sections comprised a plurality of longitudinally extending peripheral sections joined together. Each of the peripheral sections is bent along a plurality of longitudinally extending break lines to define a plurality of angled wall sections extending between inwardly extending edge portions. The edge portions of the peripheral sections are bolted together to form a hollow pole section.

The angled wall sections and the inwardly extending edge portions of assignee's wind turbine tower disclosed in the co-pending application make it difficult to secure the yaw plate of a wind turbine thereto. In other words, the upper end of assignee's wind turbine tower does not have a shape which is complementary to the shape of the wind turbine yaw plate. The mounting of a conventional wind turbine yaw plate onto the upper end of assignee's tower structure is made even more difficult due to the fact that assignee's tower structure has the inwardly extending edge portions of the peripheral sections.

SUMMARY OF THE INVENTION

An adapter is provided for mounting a wind turbine of conventional design onto the upper end of a wind turbine tower which is comprised of a plurality of longitudinally extending peripheral sections joined together with each of the peripheral sections being bent along a plurality of longitudinally extending break lines to define a plurality of angled wall sections extending between longitudinally inwardly extending edge portions. The adapter is generally ring-shaped and has upper and lower ends. The lower end of the adapter has a configuration complementary to the upper end of the wind turbine tower structure to enable the lower end thereof to be secured thereto. The upper end of the adapter has a configuration complementary to the yaw plate of the yaw mechanism of the wind turbine to enable the wind turbine to be mounted on the upper end of the adapter. The adapter is designed to facilitate the attachment of the yaw plate to the adapter from within the tower structure and is designed to accommodate the inwardly extending edge portions described above.

It is therefore a principal object of the invention to provide an adapter designed to permit a wind turbine to be mounted on the upper end of a wind turbine tower structure which has a configuration which is not complementary to the configuration of the yaw plate of the wind turbine.

A further object of the invention is to provide an adapter to enable a yaw plate of a wind turbine to be secured to a tower structure such as described in assignee's co-pending application, Ser. No. 10/797,778 filed Mar. 10, 2004, entitled "HOLLOW STRUCTURAL MEMBER".

These and other objects will be apparent to those skilled in the art.

BRIEF DESCRIPTION OF THE DRAWINGS

FIG. 3 is a side view of a wind turbine tower of a design such as disclosed in assignee's co-pending application Ser. No. 10/797,778 filed Mar. 10, 2004;

FIG. 4 is an enlarged partial side view of the tower of FIG. 3;

DETAILED DESCRIPTION OF THE INVENTION

The numeral 10 refers to a hollow, elongated wind turbine tower as described in assignee's co-pending application Ser. No. 10/797,778 filed Mar. 10, 2004, entitled "HOLLOW STRUCTURAL MEMBER". Tower 10 is constructed with a plurality of elongated hollow metal pole sections 12 which are secured together in an end-to-end relationship by splice plate assemblies 14, such as described in assignee's pending application Ser. No. 10/463,155, filed Jun. 17, 2003, entitled "TWO-PLATE SPLICE CONNECTION ASSEMBLY". The pole sections 12 may be tapered or non-tapered as desired.

Figure 12:
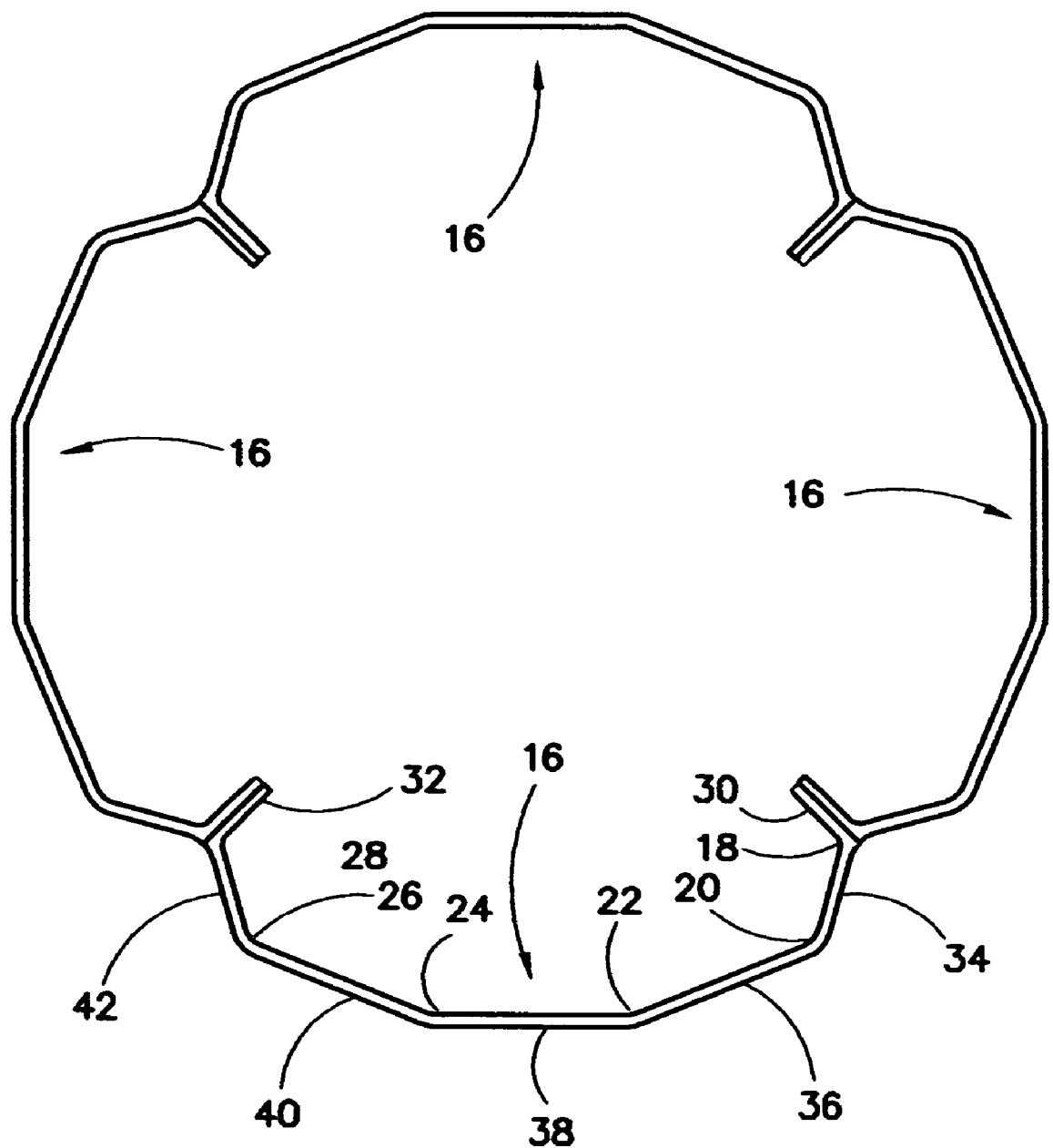
FIG. 12 is a top view of the wind turbine tower.

Each of the pole sections 12 is constructed of a plurality of longitudinally extending peripheral sections 16, preferably four (FIG. 12). Each section 16 is formed or bent from a flat sheet having opposite side edges, an upper edge and a lower edge. If the wind tower is tapered, the width of the upper edge will be less than the width of the lower edge. A plurality of bolt openings are formed in the sheet adjacent the side edges thereof. The sheet is bent or broken along break lines 18, 20, 22, 24, 26 and 28 (FIG. 12). The break lines form edge portions 30 and 32, and angled wall sections 34, 36, 38, 40 and 42 (FIG. 12). Edge portions 30 and 32 have the same width. Wall sections 34 and 42 have the same width and wall sections 36, 38 and 40 have similar widths. The inwardly extending side edges of adjacent sections 16 are bolted together to form the pole configuration illustrated in the drawings.

The numeral 44 designates a conventional wind turbine which is mounted on the upper end of the tower 10. Most wind turbines of the conventional upwind design include a yaw mechanism which is operatively connected to a yaw plate 46 with the yaw plate 46 being rigidly secured to the upper end of the wind turbine towers with the wind turbine 44 being rotatably mounted on the yaw plate 46. Sometimes the yaw plates are referred to as yaw rings.

Figures 1, 2:
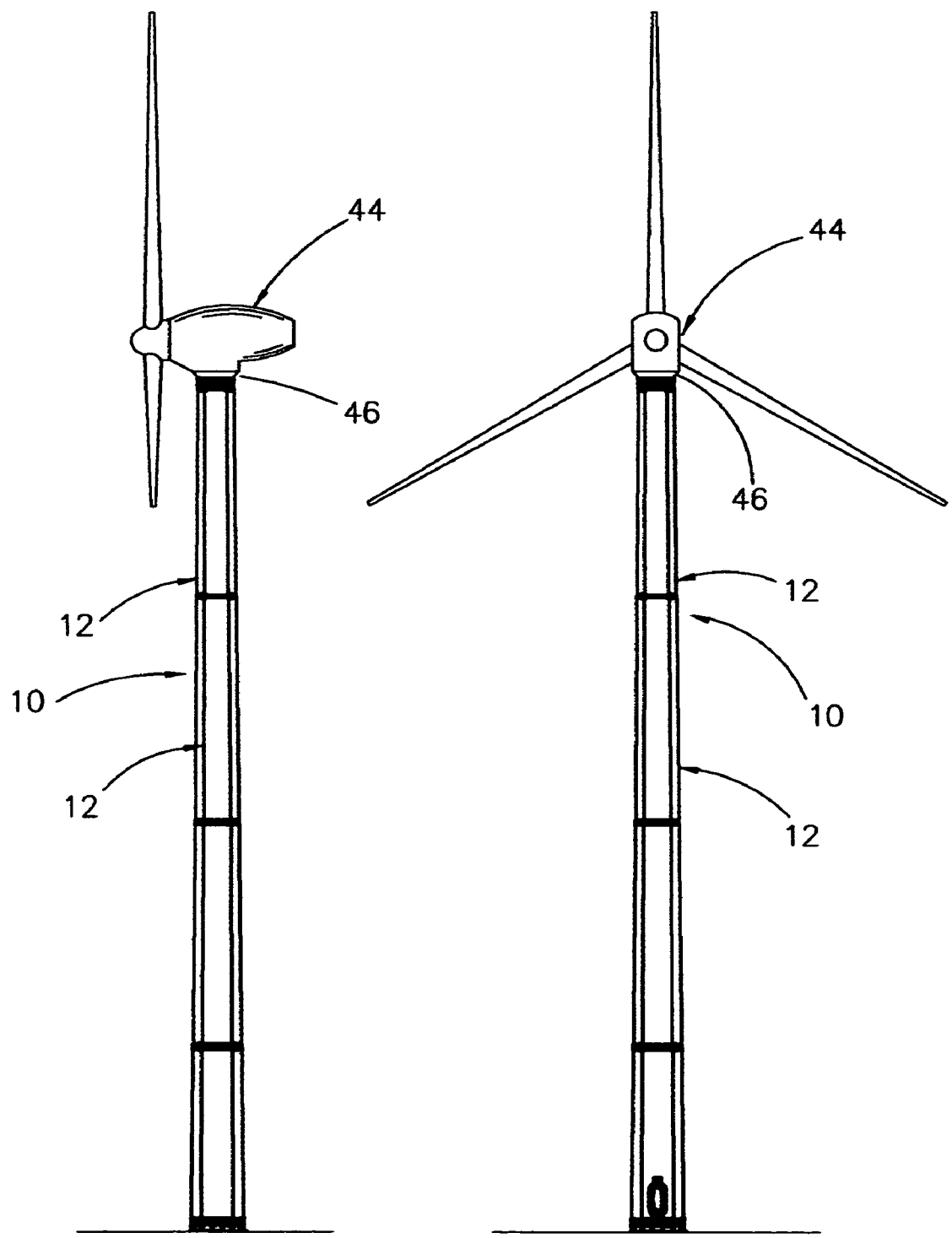
FIG. 1 is a side view of a wind turbine tower and wind turbine.
FIG. 2 is a front view of the wind turbine tower and wind turbine of FIG. 1.
Figure 5:
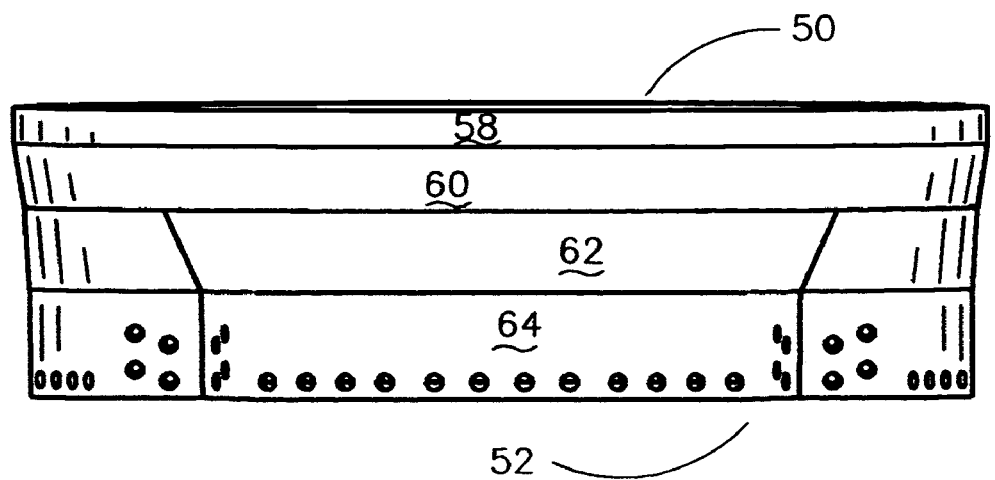
FIG. 5 is a side view of the adapter of this invention.
Figure 6:
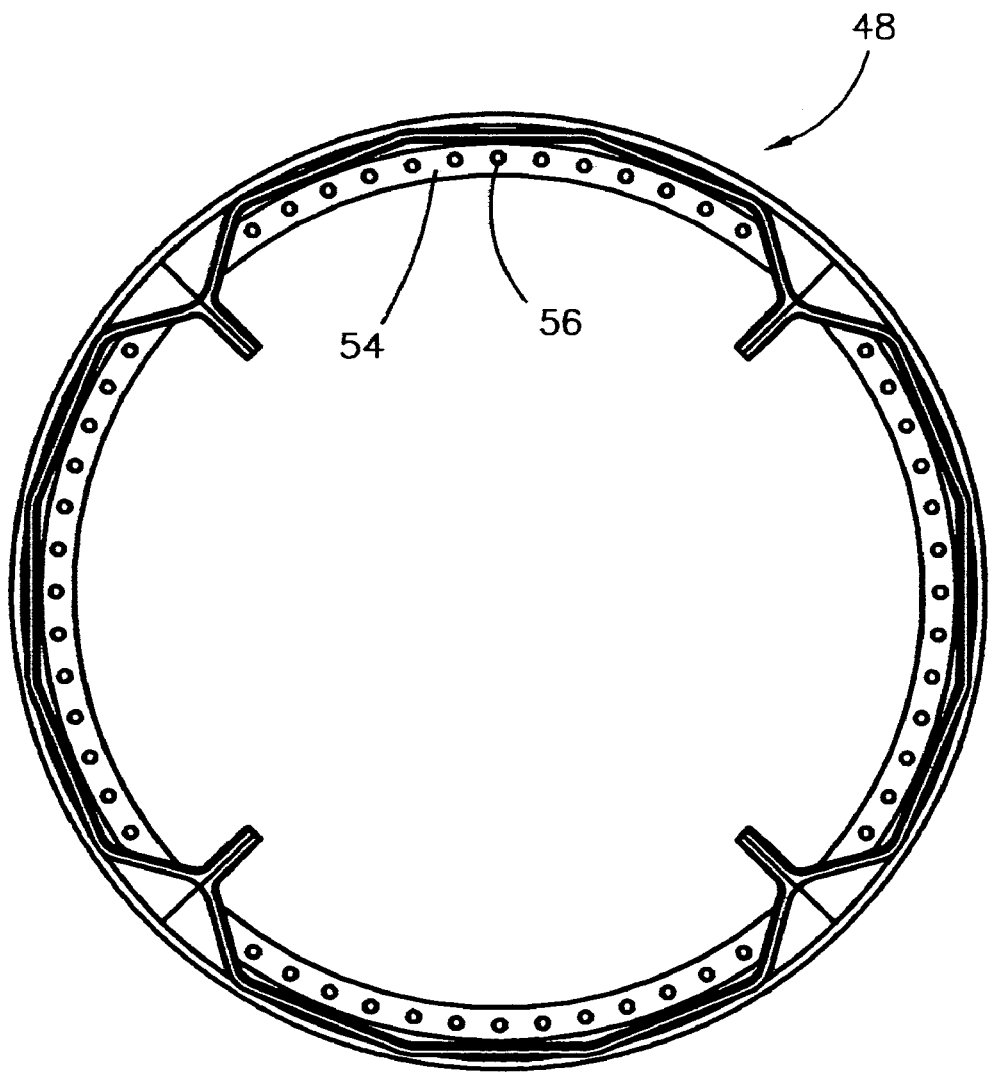
FIG. 6 is a bottom view of the adapter of this invention.
Figure 7:
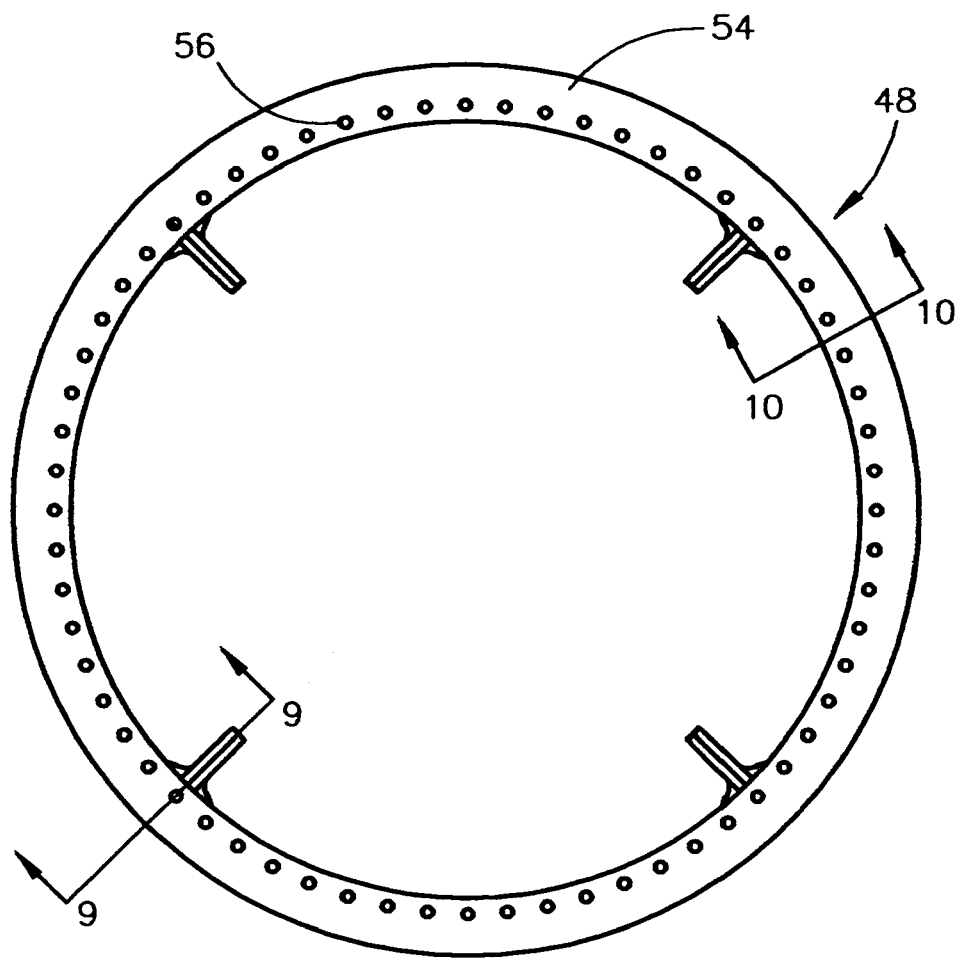
FIG. 7 is a top view of the adapter of this invention.
Figure 8:
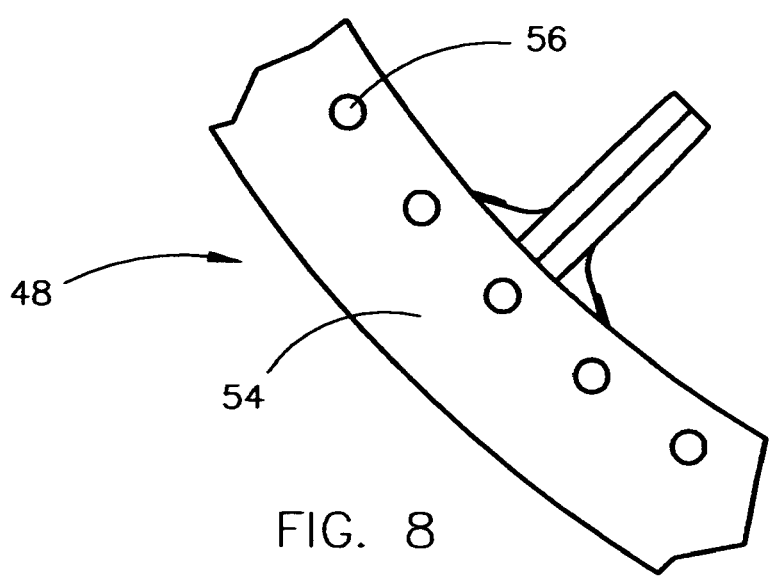
FIG. 8 is a partial top view of the adapter of this invention.

The numeral 48 refers to the adapter of this invention which enables the yaw plate 46 of wind turbine 44 to be mounted on the upper end of the tower 10. Inasmuch as the yaw plate 46 is normally disc-shaped or circular in shape, and inasmuch as the upper end of the uppermost section 12 is not complementary in shape to the yaw plate 46, an adapter is required. Adapter 48 generally includes an upper end 50 and a lower end 52 with the adapter generally being ring-shaped. Preferably, the adapter 48 is formed from a casting but it could be of welded construction if so desired. Normally, the adapter 48 will be constructed of a steel material and will normally have a height of approximately 31.75 inches, which may change in different situations. The upper end 50 of adapter 48 is ring-shaped and includes an inwardly extending flange 54 having a plurality of radially spaced-apart bolt openings 56 formed therein. For purposes of description, adapter 48 will be described as including wall sections 58, 60, 62 and 64. The outer diameter of wall section 58 is cylindrical as is the outer diameter of wall section 60, although wall section 60 tapers inwardly from its upper end to lower end, as seen in FIG. 4. Wall sections 62 and 64 extend downwardly from the lower end of wall section 60 and comprise a plurality of angled wall portions, as seen in FIG. 6. Thus, the outer wall section 58 and inwardly extending flange 54 are complementary in shape to the yaw plate 46 while the lower end of the wall section 64 is complementary in shape to the upper end of the pole section 12.

Figures 9, 10:
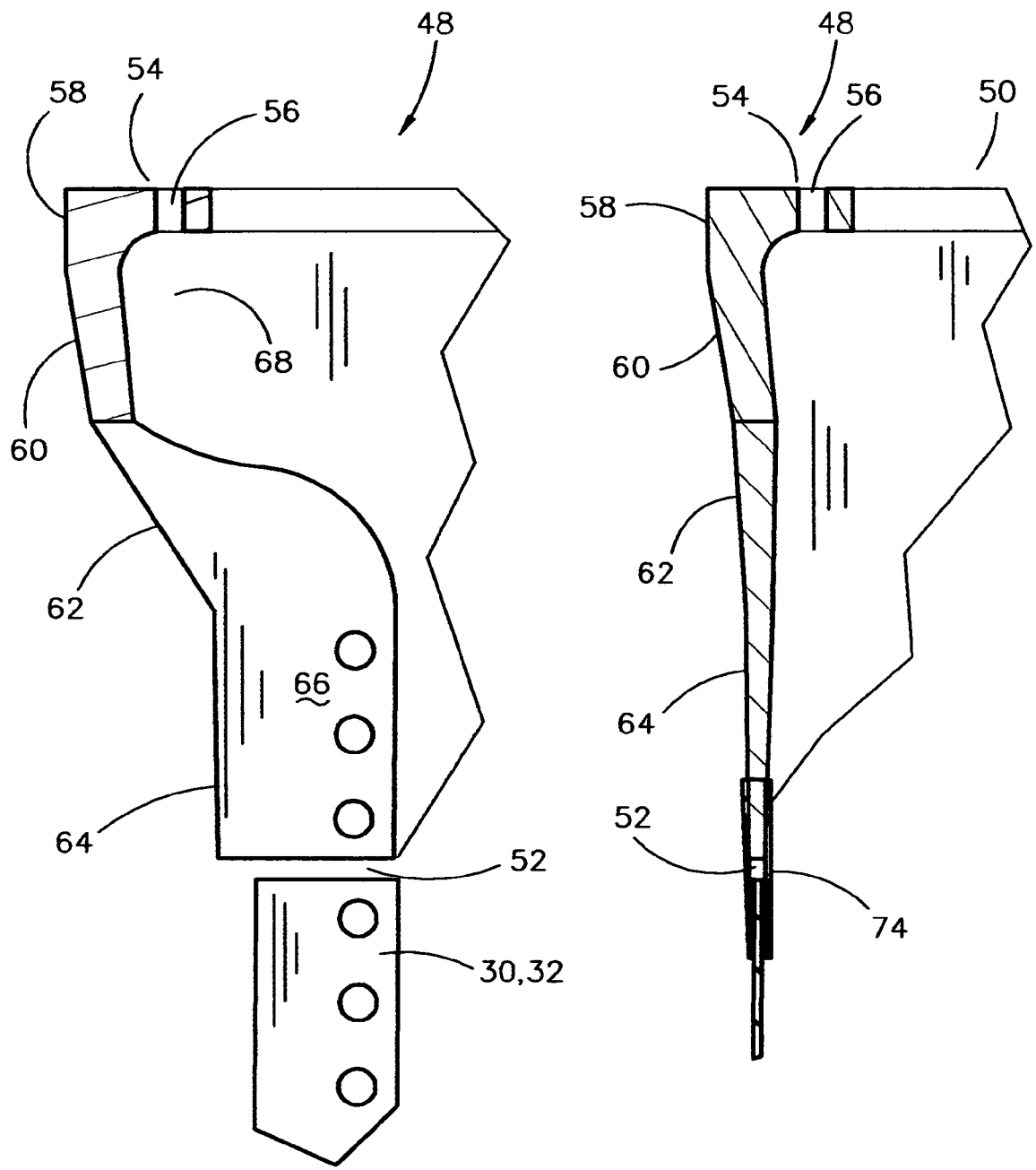
FIG. 9 is a sectional view as seen on lines 9-9 of FIG. 7.
FIG. 10 is a sectional view as seen on lines 10-10 of FIG. 7.
Figure 11:
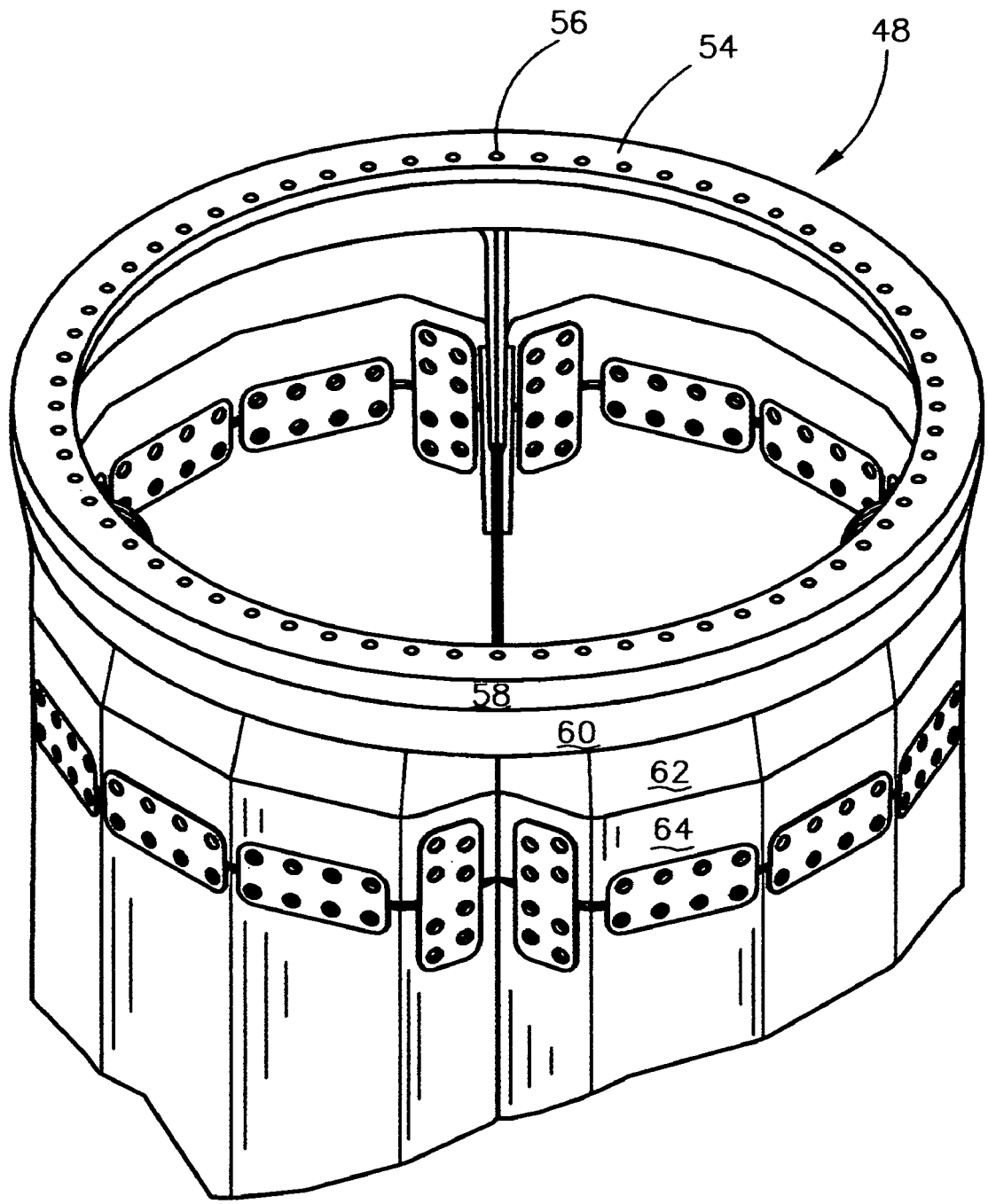
FIG. 11 is a perspective view of illustrating the adapter mounted on the upper end of the wind turbine tower of Ser. No. 10/797,778.

Essentially, the cross-sectional configuration of the lower end of the adapter 48 is the same as that of the upper end of the uppermost pole section 12. In other words, if pole section 12 is comprised of four quadrants, petals or sections 16, adapter 48 will also have four quadrants or sections. At the juncture of the quadrants or sections of adapter 48, wall sections 62 and 64 taper inwardly to a greater degree (FIG. 9) than the other sections to provide inwardly extending edge portions 66 which may be spliced onto the upper ends of the inwardly extending side edge portions 30, 32 of the sections 16 (FIG. 9). As seen in FIG. 9, the design of the adapter is such that it creates a space 68 below the bolt openings 56 at the juncture of the sections 16 to provide ample space for inserting bolts upwardly through the openings 56 and into the yaw plate 46 which is positioned upon the upper surface of flange 54. The lower end of adapter 48 is secured to the upper end of the petals of the sections 16 by means of splice plates 74, such as described in the co-pending application of assignee, Ser. No. 10/463,155 filed Jun. 17, 2003, entitled "TWO-PLATE SPLICE CONNECTION ASSEMBLY".

Thus it can be seen that a novel adapter has been provided which enables the yaw plate 46 of a wind turbine 44 to be mounted on the upper end of assignee's wind turbine tower even though the upper end of assignee's wind turbine tower is not complementary in shape to the yaw plate 46 of the conventional wind turbine 44.

Thus it can be seen that the invention accomplishes at least all of its stated objectives.

I claim:

1. A means for mounting the yaw mechanism of a wind turbine on the upper end of a wind turbine tower structure having a configuration which is not complementary to the yaw mechanism, comprising:

an adapter having upper and lower ends;

said lower end of said adapter having a configuration complementary to the upper end of the wind turbine tower structure to enable said lower end thereof to be secured to the upper end of the wind turbine tower structure;

said upper end of said adapter having a configuration which is complementary to the yaw mechanism to enable the yaw mechanism to be mounted thereon;

said wind turbine comprising a plurality of longitudinally extending peripheral sections joined together with each of the peripheral sections being bent along a plurality of longitudinally extending break lines to define a plurality of angled wall sections extending between longitudinally inwardly extending edge portions;

said upper end of said adapter being generally ring-shaped;

said lower end of said adapter defining a plurality of angled wall sections;

said adapter having a greater outside diameter at its said upper end than the outside diameter of said lower end thereof.

2. The means of claim 1 wherein said upper end of said adapter includes an inwardly extending, ring-shaped flange portion.

3. The means of claim 2 wherein said flange portion has a plurality of spaced-apart mounting holes formed therein.

4. The means of claim 1 wherein said lower end of said adapter has a plurality of bolt openings formed therein to enable said adapter to be splice-plated to said wind turbine tower structure.

5. A means for mounting the yaw mechanism of a wind turbine on the upper end of a wind turbine tower structure having a configuration which is not complementary to the yaw mechanism, comprising:

an adapter having upper and lower ends;

said lower end of said adapter having a configuration complementary to the upper end of the wind turbine tower structure to enable said lower end thereof to be secured to the upper end of the wind turbine tower structure;

said upper end of said adapter having a configuration which is complementary to the yaw mechanism to enable the yaw mechanism to be mounted thereon;

said wind turbine comprising a plurality of longitudinally extending peripheral sections joined together with each of the peripheral sections being bent along a plurality of longitudinally extending break lines to define a plurality of angled wall sections extending between longitudinally inwardly extending edge portions;

said upper end of said adapter being generally ring-shaped;

said lower end of said adapter defining a plurality of angled wall sections;

said upper end of said adapter including an inwardly extending, ring-shaped flange portion;

said flange portion having a plurality of spaced-apart mounting holes formed therein to which the yaw mechanism may be bolted;

said lower end of said adapter having a plurality of bolt openings formed therein to enable said adapter to be splice-plated to the wind tower structure.

* * * * *